Sept. 1, 1970     W. L. BECKWITH, JR     3,526,369

CHUCK SPINDLE

Filed Nov. 9, 1967

INVENTOR.
WALTER L. BECKWITH, JR.
BY Albert P. Davis
Burnett W. Norton
ATTORNEYS United States Patent Office 3,526,369
Patented Sept. 1, 1970

3,526,369
CHUCK SPINDLE
Walter L. Beckwith, Jr., Warwick, R.I., assignor to Leesona Corporation, Warwick, R.I., a corporation of Massachusetts
Filed Nov. 9, 1967, Ser. No. 681,847
Int. Cl. B65h 75/30; B23b 31/12
U.S. Cl. 242—46.4
14 Claims

ABSTRACT OF THE DISCLOSURE

A spindle including a chuck for mounting a yarn package tube. The chuck is so constructed that chuck members are resiliently urged into gripping engagement with the tube and maintain substantially the same force against the tube regardless of centrifugal force developed upon rotation of the spindle.

---

This invention relates to textile machinery and, more particularly, to a spindle including a chuck for mounting a tube forming the core of a yarn package.

Throughout this specification, the term "yarn" means all kinds of strand material, either textile or otherwise, and the term "package" means the product of a winding or twisting machine, whatever its form.

When yarn packages are to be sold, it is desirable that the yarn be wound on disposal paper tubes to minimize cost. The tube must be sufficient strong to withstand forces at relatively high winding speeds, for example 10,000 r.p.m. If the force of chuck members against the tube increases because of centrifugal force, a stronger and therefore more expensive tube is required. Furthermore, in winding on such paper tubes it is highly desirable that the force of the chuck members against the tube be held to a predetermined maximum in order to minimize deformation and indentation of the tube.

The invention, in brief, is directed to a spindle having a chuck for centering and holding a tube on which a package of yarn is wound. The chuck includes a body which receives the tube, and a plurality of chuck members radially and axially spaced along the body and operable between a gripping position engaging and holding the tube on the body, and a release position for releasing the tube for removal from the body. These chuck members are mounted in such a manner that any substantial tendency to move toward or away from the tube responsive to centrifugal force upon rotation of the body, is effectively prevented. An actuating rod is operable for moving the chuck members into and out of engagement with the tube and a spring acting against the actuating rod resiliently urges the chuck members into engagement with the tube with a predetermined maximum force.

It is a primary object of this invention to provide a new and improved spindle and, more particularly, a spindle chuck.

Another object of this invention is to provide a new and improved spindle and spindle chuck for mounting tubes on which yarn packages may be wound. A related object is provision of such a spindle for effectively preventing centrifugal force, upon rotation of the spindle, from effecting the tube and its mounting on the spindle. Another related object is provision in such a spindle for centering the tube and automatically limiting the force applied to the tube to a predetermined maximum.

These and other objects and advantages of the invention will be apparent from the following description and the accompanying drawings, in which.

Figure 1:
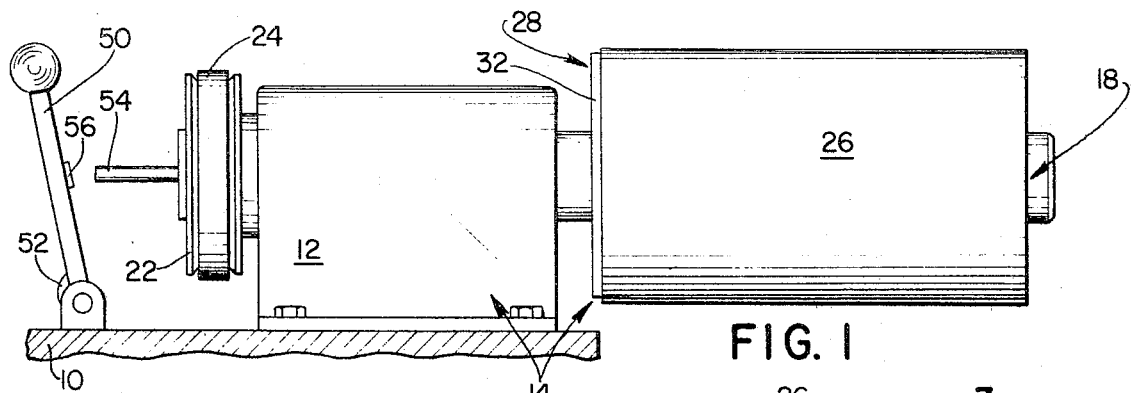
FIG. 1 is an elevational view of an embodiment of the invention.
Figures 2, 3:
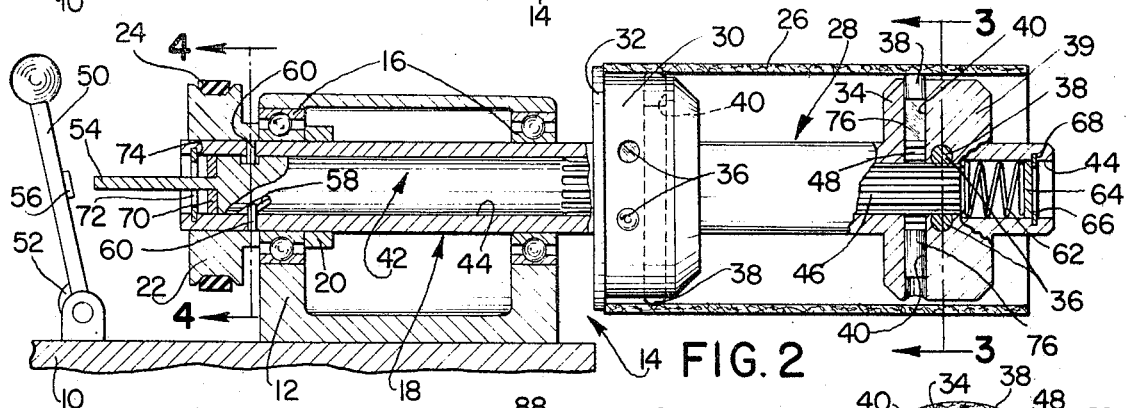
FIG. 2 is a view similar to FIG. 1, with parts broken away and removed for clearer illustration.
Figure 5:
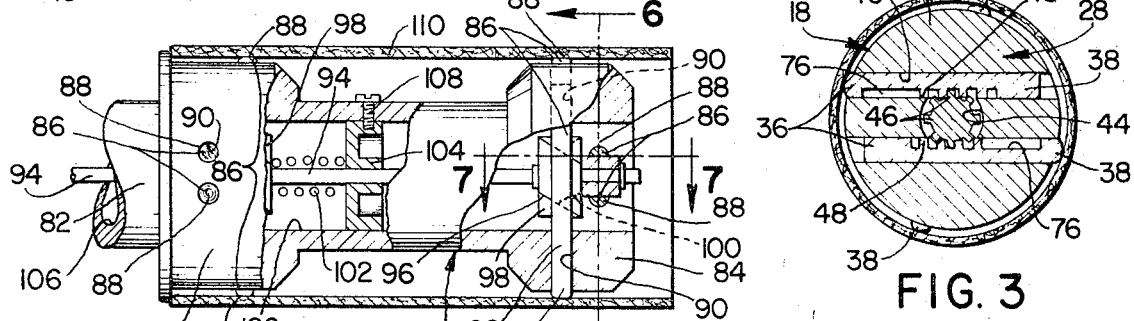
Figures 4, 6, 7:
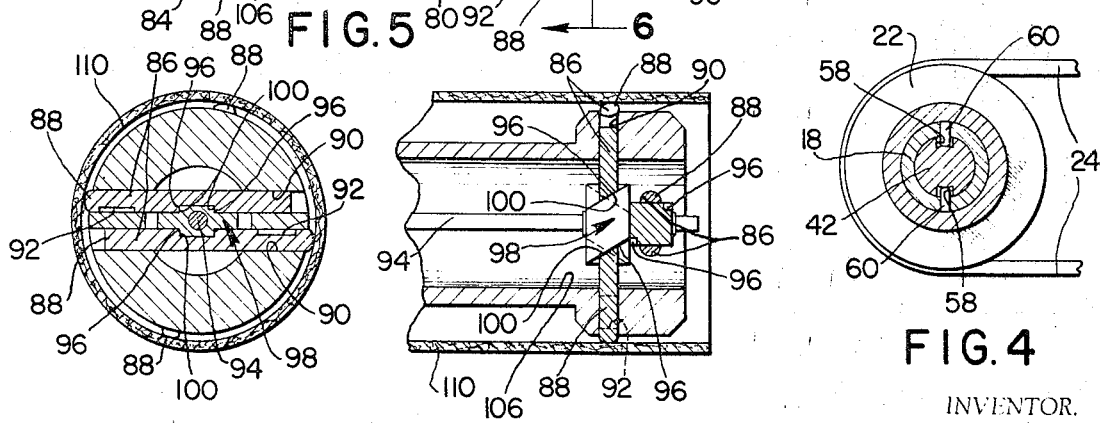

FIGS. 3 and 4 are sectional views taken generally along the lines 3—3 and 4—4 in FIG. 2, respectively;

FIG. 5 is a fragmentary view similar to a portion of FIG. 1, but illustrating another embodiment of the invention, with parts broken away and removed for clearer illustration; and FIGS. 6 and 7 are sectional views taken generally along the line 6—6 and 7—7, respectively, in FIG. 5.

Referring to FIGS. 1 and 2 of the drawings, a base 10 of a winding machine suitably mounts a housing 12 of a spindle assembly 14. The housing 12 carries suitable bearings 16 which rotatably mount a spindle shaft 18 held against axial movement by a collar 20 suitably removably fixed to the spindle shaft on an inner side of one of the bearings 16, and the hub of a belt pulley wheel 22 suitably releasably fixedly secured to the spindle shaft on the other side of this bearing. Rotation of the spindle shaft 18 is provided through a belt 24 received by the wheel 22. A tube 26 of paper or other suitable material is mounted on a chuck portion 28 of the spindle shaft 18 in position for winding of a strand of yarn thereon to form yarn package.

With particular reference to FIGS. 2 and 3, the chuck portion 28 of the spindle shaft 18 includes a chuck body having a pair of spaced apart bosses including an inner (left hand) boss 30 with a shoulder 32 which abuts the tube 26, and an outer boss 34. Each boss 30 and 34 mounts two pairs 36 of chuck members 38 which engage the inner surface of the tube 26 for centering and releasably holding the tube on the spindle shaft. These pairs of chuck members are axially spaced along the chuck body and are radially spaced 90° from each other.

One pair of these chuck members is shown in FIG. 3, the other pairs are identical except for location and orientation. Each pair 36 includes a two oppositely disposed chuck members 38. Each chuck member 38 is in the form of a pin telescopically and snugly received in a passage 40 perpendicular to the rotational axis of the spindle shaft 18. The chuck members 38 are shown in a gripping position with arcuate ends engaging the tube 26.

In order to move the chuck members 38 to a release position telescoped inwardly in their passages 40 and spaced from the tube 26, an actuator rod 42 is provided in a passage 44 extending longitudinally to the spindle shaft 18. Cooperating gear means on the actuator rod 42 and the chuck members 38 provide for movement of the chuck members between their release and gripping positions responsive to rotation of the rod, and substantially equal outward displacement of the chunk members into engagement with the tube. More particularly, this gear means is in the form of splines 46 along the actuating rod 42 and as shown parallel to the axis of the spindle shaft, and cooperating sets of rack teeth 48 on each of chuck members 38. Upon rotation of the actuating rod 42 in a clockwise direction as shown in FIG. 3, the chuck members 38 are moved to release position out of engagement with the tube 26. Such clockwise rotation may be provided by means of a lever 50 pivotally mounted on the base 10 and normally retained in an inclined position against a stop 52 and away from an actuating finger 54 extending axially outwardly from the left end of the actuating rod 42. Upon pivotal movement of the lever 50 in a clockwise direction, a pad 56 on the lever engages the free end of the finger 54 and moves the actuating rod axially to the right. Such movement is transposed into rotary movement by means of a pair of spiral grooves 58 in the actuating rod 42 engaged by pins 60 suitably fixedly mounted in the spindle shaft 18, as may best be seen in FIGS. 2 and 4.

Upon release of the lever 50, the actuating rod 18 is urged to the left by a compression spring 62 mounted in the right end of the spindle shaft passage 44 in abutting engagement with the right end of the actuator rod 42 and a disc 64 releasably secured in the spindle shaft passage by means of a snap ring 66 seated in an annular groove 68 in the spindle shaft 18. When the tube 26 is removed from the spindle shaft, and the actuating lever 50 is released to permit the chuck members 38 to move to their gripping position, the spring 62 urges the actuating rod 42 to the left until the left end of the rod and a washer 70 on the finger 54 seats against a snap ring 72 suitably seated in an annular groove 74 in the left end of the spindle shaft 18.

The compression spring 62 is further effective for urging the clamping members 38 into engagement with the inner surface of the tube 26 with a predetermined maximum force. Thus, it will be seen that the chuck members 38 can only be urged into engagement with the tube with a force not exceeding the force of the spring.

Upon rotation of the spindle, centrifugal force would normally act to urge chuck members outwardly into tighter engagement with the tube. In order to prevent this occurrence, the chuck members 38 are firmly mounted for snug sliding motion in their passages 40 and are balanced so that in the gripping position their center of mass lies along a radial line and in an axial plane perpendicular to the path of movement of the chuck members into engagement with the tube (in general, the path of movement between the release position and the gripping position). In order to balance the chuck members, material may be removed as indicated by the cut-out portions 76 in FIGS. 2 and 3.

FIGS. 5-7 show another embodiment of the invention in which a chuck body 80 is integral with a spindle shaft 82 and has a pair of axially spaced bosses 84 each with two pairs 86 of chuck members 88 firmly mounted for snug telescopic movement in passages 90 transverse to the axis of the spindle shaft 82 and balanced, as by cut-outs 92, all as previously described. However the chuck members 88 are operated between gripping and release positions by cooperating cam means on an actuating rod 94 and the chuck members. This cam means includes beveled cam surfaces 96 on axially spaced cam blocks 98 fixedly secured to the actuating rod 94 and cooperating beveled cam surfaces 100 on each chuck member 88. The pairs of chuck members in each boss 84 are actuated by a common cam block 98 having pairs of cam surfaces 96, one of the pairs of each of the pairs of chuck members in the associated boss. Each chuck member has a recess providing a pair of these parallel, facially opposed beveled cam surfaces 100, and in operative assembly as shown, the recess receives a portion of the cam block 98 with opposite beveled cam surfaces 96 facially opposed to the associated beveled cam surfaces 100 on the chunk members 88. As the actuating rod 94 is moved to the right, the chuck mebers are moved to their release position. When the rod moves to the left the chuck members move to their gripping position.

As in the prior embodiment, the chuck members are resiliently urged into engagement with the inner surface of the tube by a compression spring 102 here having one end seated against the left hand one of the cam blocks 98 and an opposite end seated against a collar 104 which telescopically receives the actuating rod and is removably fixed in place in an axial passage 106 of the spindle shaft 82 by means of a suitable set screw 108. The compression spring 102 again assures the chuck members 88 being urged into engagement with a tube 110 received on the spindle, only with a predetermined maximum force, as previously described.

While this invention has been described and illustrated with reference to particular embodiments in a particular environment, various changes may be apparent to one skilled in the art, and the invention is therefore not to be limited to such embodiment or environment except as set forth in the appended claims.

What is claimed is:
1. For use in a yarn handling machine, a spindle for mounting a yarn tube, comprising a body adapted to telescopically receive the tube and to be rotated about an axis for winding an advance strand of yarn onto the tube to form a package, gripping means including a member movable between a gripping position for engaging and holding the tube on said body, and a release position for releasing the tube for removal of the package from the body, means mounting said member for movement along a path between said positions with the center of mass of said member substantially in an axial plane generally normal to said path when said member is in said gripping position for effectively preventing any substantial tendency of said member to move along said path responsive to centrifugal force upon rotation of said body about said axis when said member is in said gripping position, and operating means for moving said member between said positions.

2. A spindle as set forth in claim 1 in which said operating means includes resilient means urging said member away from said release position for gripping engagement with said tube when said member is in said gripping position.

3. A spindle as set forth in claim 1 in which the mounting means comprises a passage in said body transverse to said axis, and said member is firmly received in said passage for movement along said path.

4. A spindle as set forth in claim 1 in which the mounting means comprises a passage in said body transverse to said axis, and said member is firmly received in said passage for movement along said path and said operating means includes resilient means for urging said member into gripping engagement with said tube when said member is in said gripping position.

5. For use in a yarn handling machine, a spindle for mounting a yarn tube, comprising a body adapted to telescopically receive the tube and to be rotated about an axis for winding an advance strand of yarn onto the tube to form a package, a plurality of members movable between a gripping position for engaging and holding the tube on said body, and a release position for releasing the tube for removal of the package from the body, mounting means defining paths radially and axially spaced along said body, one for each of said members, and said mounting means mounting each said member for movement along its path between said positions with its center of mass substantially in an axial plane generally normal to the path for effectively preventing any substantial tendency of said member to move along its path responsive to centrifugal force upon rotation of said body about said axis when said members are in said gripping position, and operating means for moving said members between said positions and including actuating means urging said members away from said release position for gripping engagement with said tube with a predetermined maximum force when said members are in said gripping position.

6. A spindle as set forth in claim 5 in which the mounting means comprises passages in said body transverse to said axis and defining said paths, one of said passages for each of said members.

7. A spindle as set forth in claim 6 in which said actuating means comprises an actuator, means connecting said actuator with said members for moving said members from said release position to substantially equal distances from said axis in said gripping position, and resilient means for urging said members into gripping engagement with said tube with said maximum force.

8. A chuck device comprising a chuck body adapted to be rotated about an axis, a chuck member movable between a gripping position for retaining an object received by said body, and a release position for releasing the object, means mounting said member for movement along a path between said positions with the center of mass of said member substantially in an axial plane generally normal to said path when said member is in said gripping position for effectively preventing any substantial tendency of said member to move along said path responsive to centrifugal force upon rotation of said body about said axis when said member is in said gripping position, and operating means for moving said member between said positions.

9. A device as set forth in claim 8 in which said mounting means comprises a passage in said body, said passage being transverse to said axis, and said member is received in said passage.

10. A device as set forth in claim 8 in which said operating means includes resilient means urging said member away from said release position for gripping engagement with said object when said member is in said gripping position.

11. A device as set forth in claim 8 in which the mounting means comprises a passage in said body transverse to said axis, and said member is firmly received in said passage.

12. A device as set forth in claim 11 in which said operating means comprises an actuator, means connecting said actuator with said member for moving said member between said positions, and resilient means urging said member away from said release position for gripping engagement with said object when said member is in said gripping position.

13. A device as set forth in claim 12 in which said connecting means comprises cooperating cam surfaces on said actuator and said member.

14. A device as set forth in claim 12 in which said connecting means comprises cooperating gear means on said actuator and said member.

References Cited

UNITED STATES PATENTS

| | | | |
|---|---|---|---|
| 664,643 | 12/1900 | Jackson | 242—46.3 |
| 1,333,632 | 3/1920 | Robinson | 242—46.3 |
| 1,807,199 | 5/1931 | Dear | 242—72 X |
| 2,266,408 | 12/1941 | Bruestle | 242—72.1 |
| 2,638,283 | 5/1953 | Bebech | 242—72 |
| 2,734,691 | 2/1956 | Godat | 242—72 |

STANLEY N. GILREATH, Primary Examiner

U.S. Cl. X.R.

242—72.1; 279—2, 110